April 20, 1954  W. H. HICKOK ET AL  2,675,838
TAPELESS VENEER SPLICER
Filed July 14, 1953  6 Sheets-Sheet 1
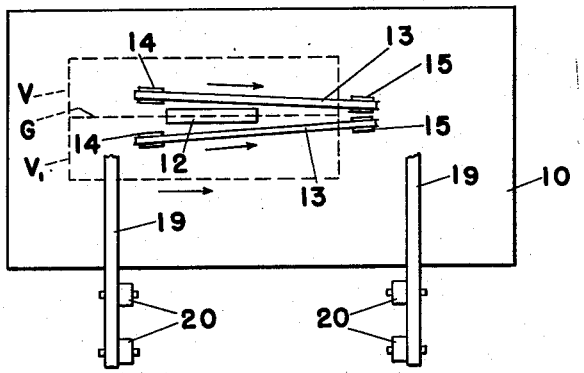
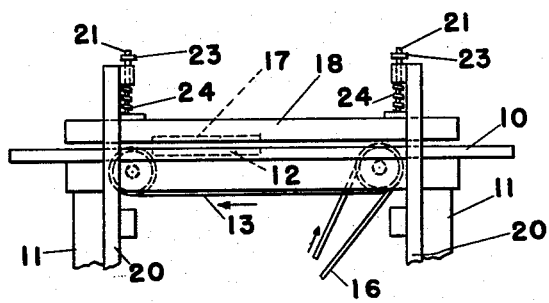
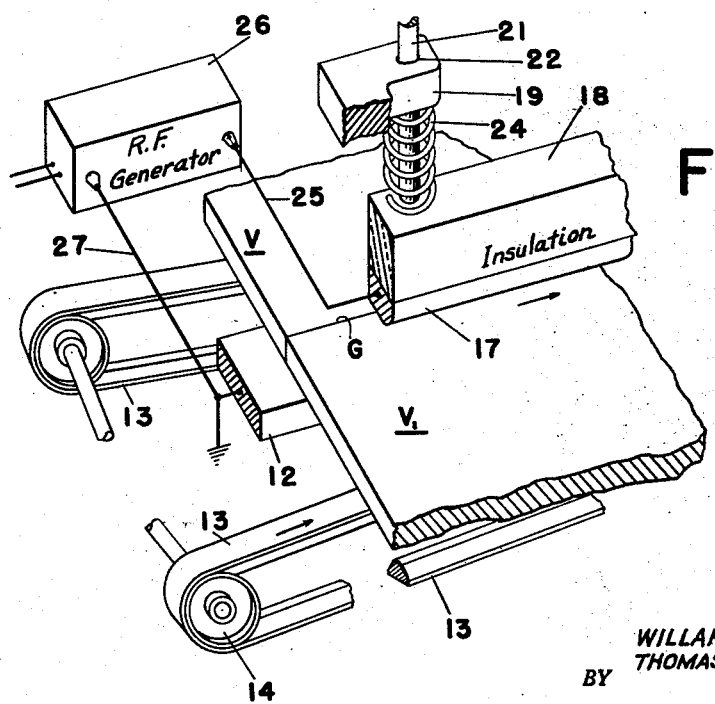
INVENTORS
WILLARD H. HICKOK
THOMAS E. LEWIS
BY
*Woodcock and Phelan*
ATTORNEYS

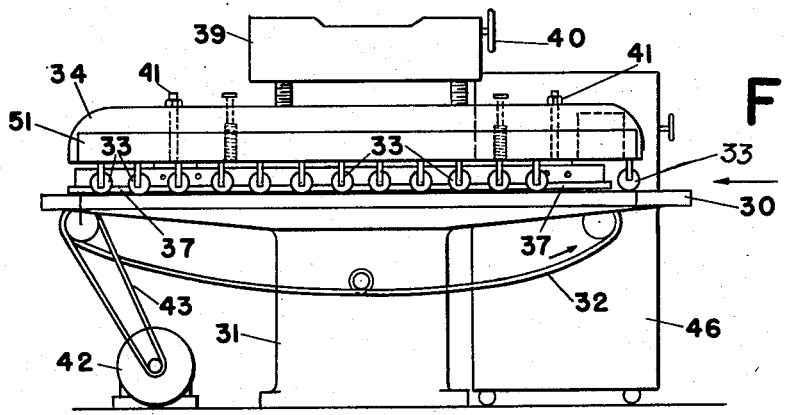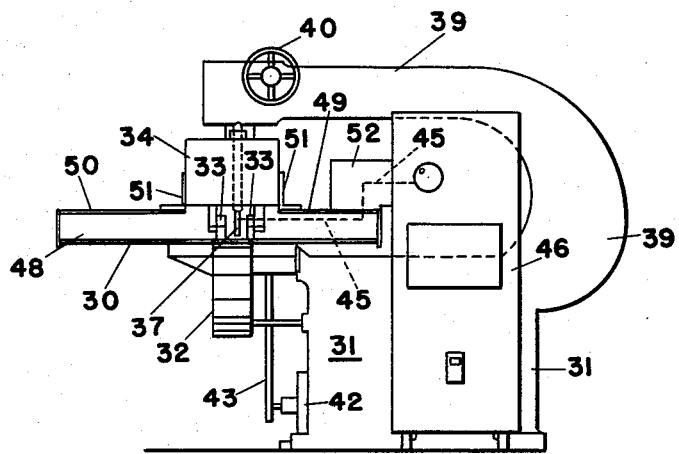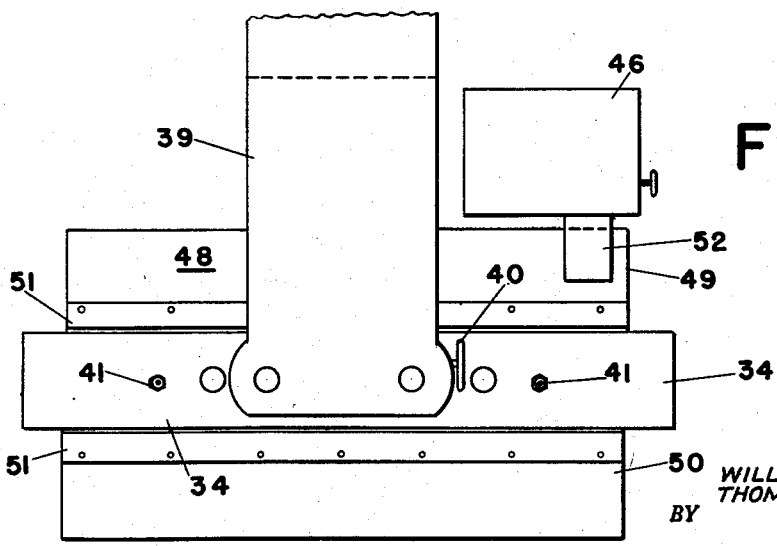

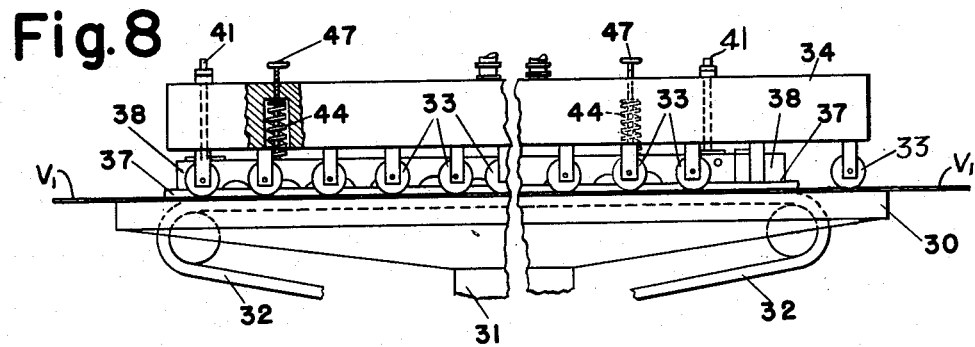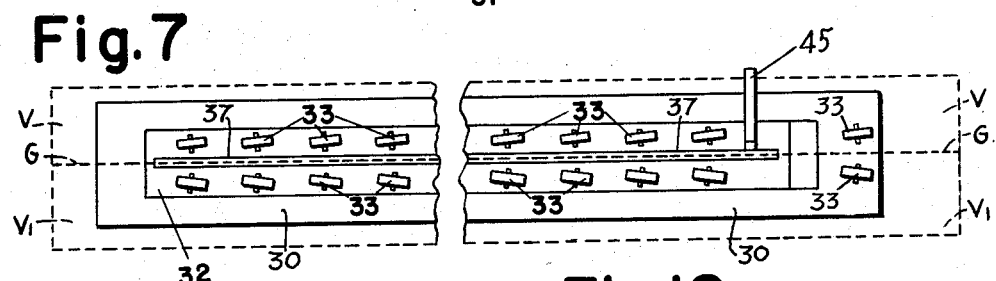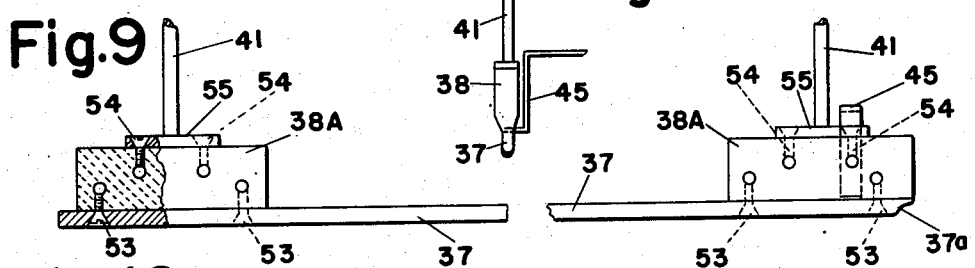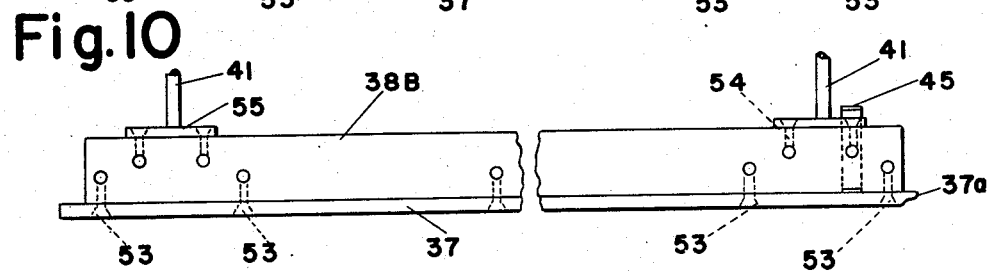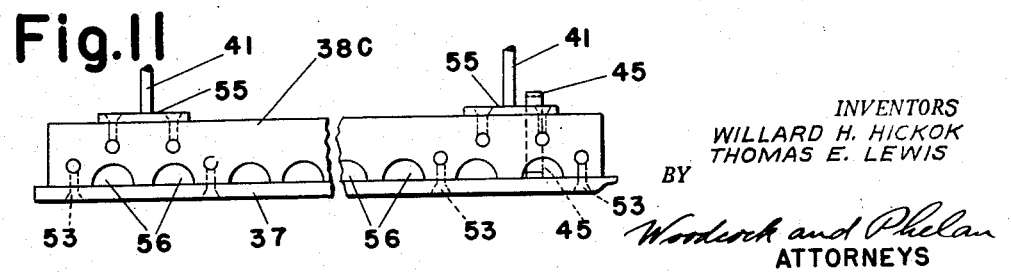

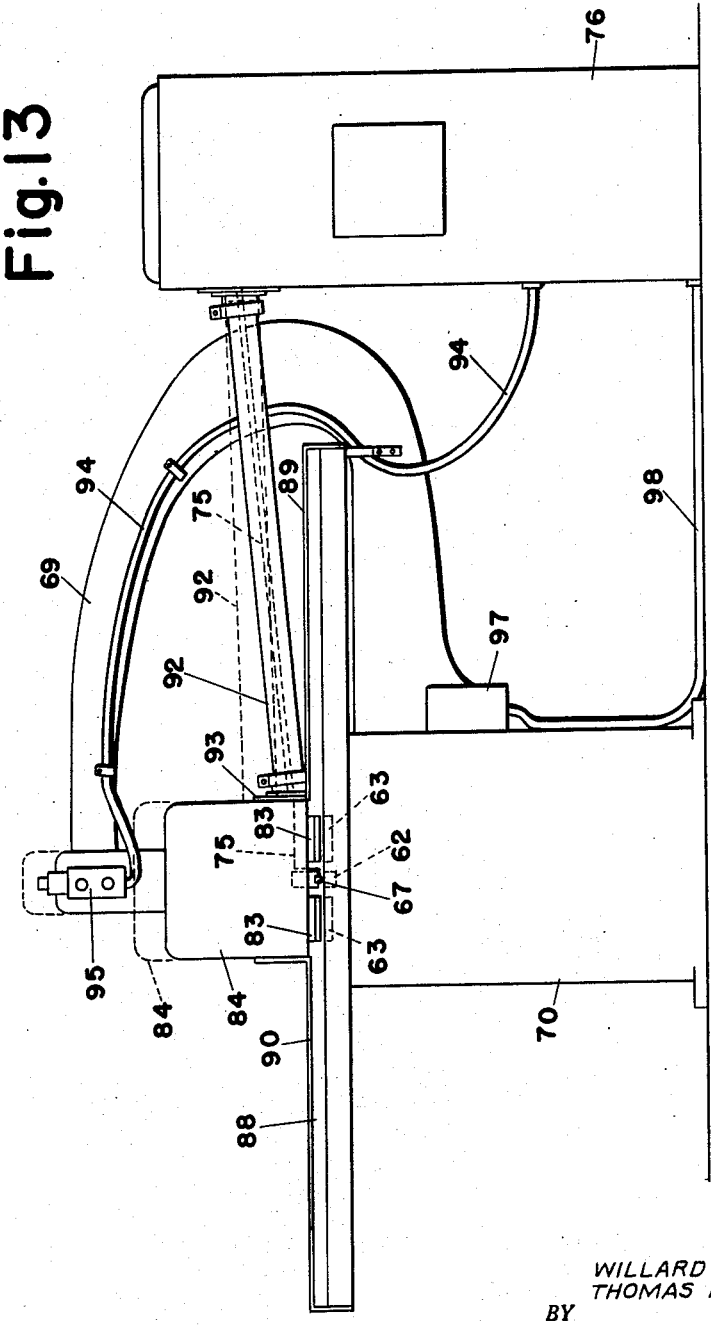

April 20, 1954 W. H. HICKOK ET AL 2,675,838
TAPELESS VENEER SPLICER
Filed July 14, 1953 6 Sheets-Sheet 5
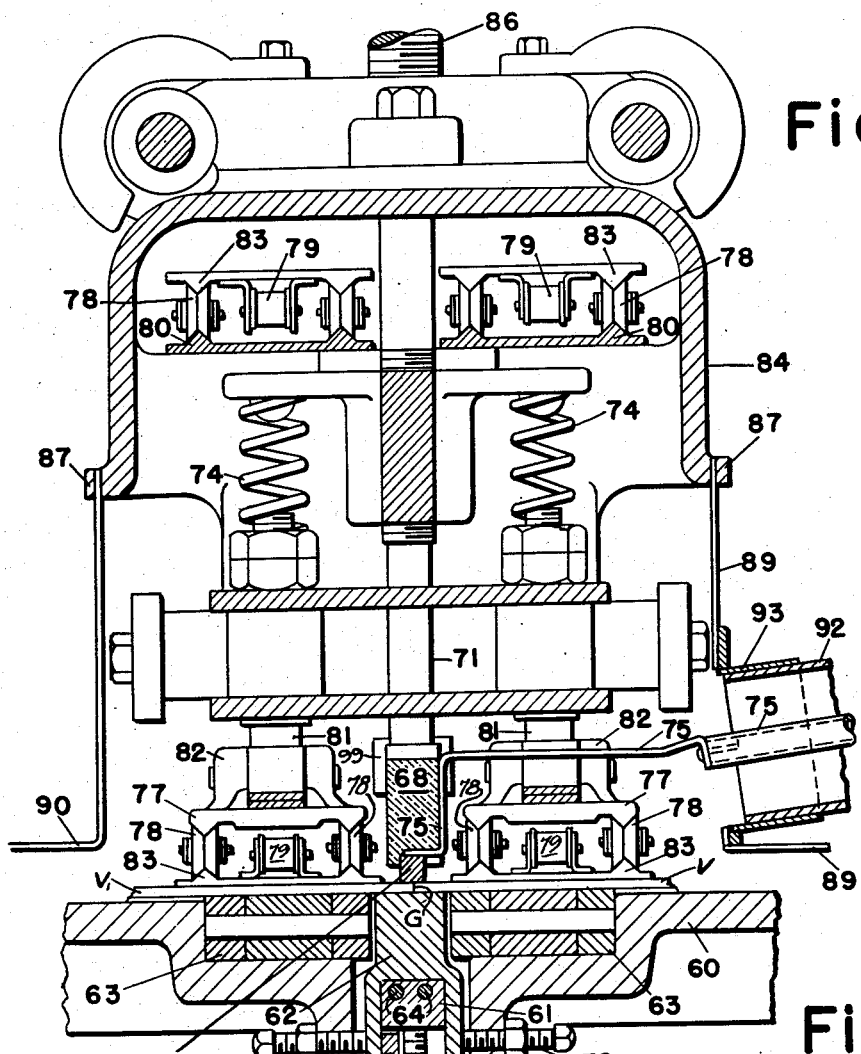
Fig.14
Fig.15
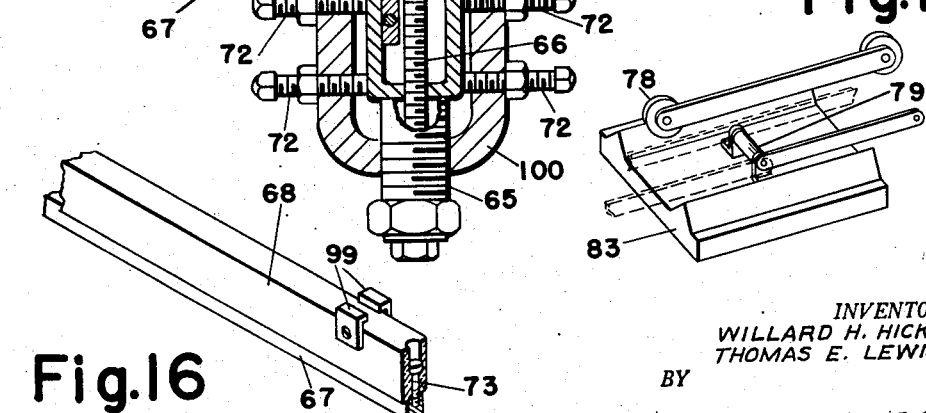
Fig.16
INVENTORS
WILLARD H. HICKOK
THOMAS E. LEWIS
BY
Woodcock and Phelan
ATTORNEYS

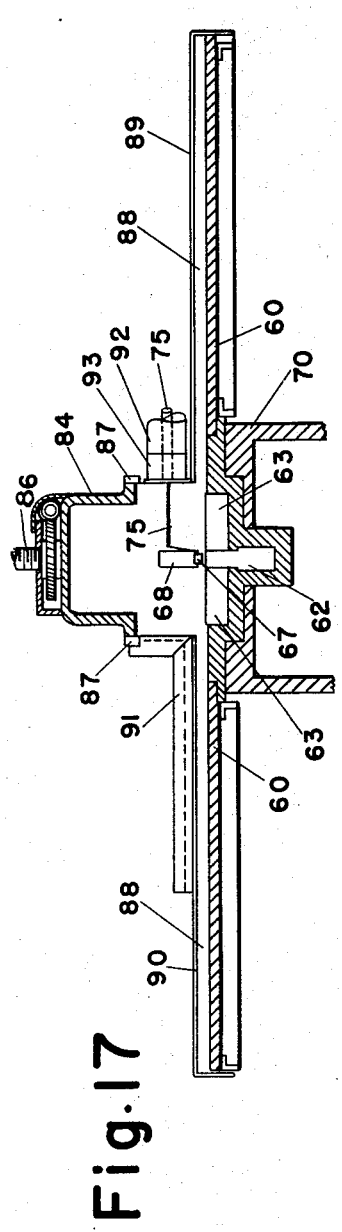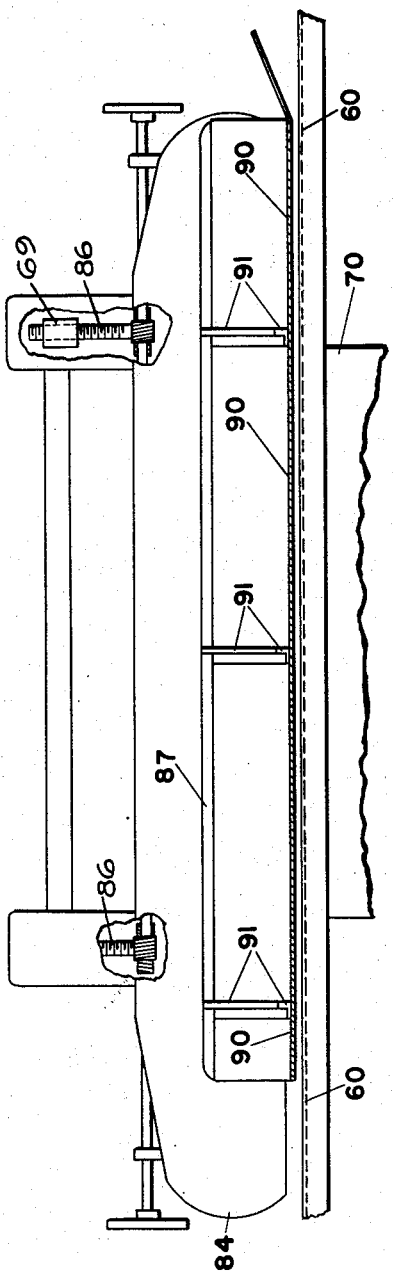

Patented Apr. 20, 1954

2,675,838

UNITED STATES PATENT OFFICE 2,675,838

TAPELESS VENEER SPLICER

Willard H. Hickok and Thomas E. Lewis, Louisville, Ky., assignors to National Cylinder Gas Company, Chicago, Ill., a corporation of Delaware Application July 14, 1953, Serial No. 367,892

13 Claims. (Cl. 144—279)

This invention relates to systems for splicing sheets or strips of dielectric stock and is particularly concerned with the utilization of high-frequency electric fields in the edge-gluing of sheets of veneer, such as wood veneers, to form wider sheets such as used, for example, in the manufacture of home and office furniture.

With prior "tapeless" splicing machines using heated bars for setting of the glued joint of the sheets, the permissible maximum temperature of the bars must of necessity be lower than the scorching point of the veneer: consequently, with thicker and thicker veneers, increasingly longer time is required for setting of the glue because of lower heat conduction from the heated bars through the wood to the glue. Such "tapeless" splicing of veneer stock greater than about one-eighth inch in thickness requires operation of the splicing machines at output-speeds too slow to be economically practical. In consequence, for the thicker veneers, it has heretofore been the common practice to effect splicing by adhesively applying paper tape to overlie abutting edges of the sheets; although this is faster than the aforesaid tapeless splicing, no actual bond is formed between the abutting edges of the sheets.

In accordance with the present invention, tapeless splicing of veneer or other dielectric stock is effected at high rate regardless of the thickness of the stock and without danger of scorching by so feeding the sheets that the glue line between their abutting edges moves lengthwise of and between a pair of elongated high-frequency electrodes whose field progressively sets the glue. Splicing of thicker stock at high rate merely requires a higher radio-frequency input to the electrodes but this neither increases the electrode temperature nor enforces a lower rate of sheet feed.

More specifically, the glue or adhesive subjected to the high-frequency field is a resin glue which at cost lower than the paper tape affords a far superior splice between the veneer sheets.

In some forms of the invention, the lower electrode is a stationary metal plate, whereas in other forms it is a feed chain, or equivalent, utilized to feed the sheets through the high-frequency fields. In all forms, the upper electrode is a long narrow bar pressed against the sheets and whose sheet-engaging face is polished and preferably of chrome, Phosphor bronze or the like, to minimize adherence to glue.

In preferred forms of the invention, there is attached to the supporting head for the upper electrode a sheet-metal structure which defines a tunnel through which the spliced sheets are fed. This tunnel structure minimizes arcing between feed chains, pressure rolls, or other machine elements, and also minimizes high-frequency radiation disturbing to reception of broadcast, television or other signals.

The invention further resides in methods and systems having the features of novelty hereinafter described and claimed.

For a more detailed understanding of the invention and for illustration of various embodiments thereof, reference is made to the accompanying drawings in which:

Fig. 1 is a plan view, with some parts omitted, of a high-frequency tapeless splicing machine;

Fig. 2 is a side elevational view of Fig. 1 showing upper electrode structure omitted from Fig. 1;

Fig. 3 is a perspective view on enlarged scale showing significant elements of Figs. 1 and 2;

Figs. 4 and 5 are front and side elevational views respectively of another form of high-frequency tapeless splicing machine;

Fig. 6 is a plan view of the machine shown in Figs. 4 and 5;

Fig. 7 is a plan view on enlarged scale showing the relative positions of electrode structure and pressure rolls of the machine shown in Figs. 4 and 5;

Fig. 8 is a side elevational view of Fig. 7;

Figs. 9, 10 and 11 illustrate various forms of electrode structures used in the machine of Figs. 4 to 8; the electrode structures of Figs. 10 and 11 are shown in place in Figs. 5 and 8 respectively;

Fig. 12 is an end elevational view of the electrode assembly of any of Figs. 9 to 11;

Fig. 13 is a front elevational view of a third form of tapeless splicing machine;

Fig. 14 is a sectional view, on greatly enlarged scale, of the electrode head and associated structure of Fig. 13;

Fig. 15 is a detail view, in perspective, of part of the pressure-applying chain shown in Fig. 14;

Fig. 16, in perspective, shows a part of the upper electrode structure of Fig. 14;

Fig. 17 is a cross sectional view showing the electrode and work tunnel of the machine of Fig. 14; and Fig. 18 is a side elevational view of Fig. 17.

Referring to Figs. 1 to 3, the table 10 is supported by legs 11 at convenient height so that an operator may use it to support a pair of sheets V, $V_1$ of veneer or other dielectric stock in side-by-side relation with their abutting edges, coated with unset adhesive, in engagement to form a glue line G. An elongated electrode 12 whose upper face is substantially flush with the top of the table is connected by conductor 27 to one terminal of a high-frequency generator 26 whose other terminal is connected by conductor 25 to a second elongated electrode 17 supported above electrode 12 and parallel thereto. For rapid setting of the glue, which is preferably a resin glue, the sheets V, $V_1$ are fed with the glue line G progressively moving lengthwise of the narrow elongated gap between the electrodes 12 and 17. Suitable resin glues are Plaskon 250-2, Lauxite UF-77 and Cascomite 12 manufactured respectively by Libbey-Owens Ford, Monsanto Chemical Company and the Borden Company. The high-frequency field between the electrodes generates heat within the glue line from top to bottom of the sheets. Whether the sheets be thin or thick, the heating effect is immediate throughout the glue line throughout the thickness of the stock, and there is no inequality of heating or delay with thicker sheets because of poor conduction of heat through the wood to the glue line.

In the particular arrangement shown in Fig. 1, the upper electrode 17 is attached to a substantially longer pressure bar 18 suspended from or guided by the horizontal frame members 19, 19 which are supported from the upper ends of the vertical frame members 20, 20 to overhang the top of table 10. The vertical guide rods 21, 21 pass through openings 22 in the overhanging arms 19, 19 and are attached at their lower ends to spaced points along the upper electrode support 18 which is of insulating material. The stops 23, 23 suitably attached to the guide bars 21, 21 may be provided to limit the lowermost position of the electrode assembly comprising pressure bar 18 and electrode 17. The compression springs 24, 24 disposed between the upper face of the electrode-supporting bar 18 and the lower faces of the supporting arms 19, 19 are effective to press the upper electrode 17 against the upper faces of the sheets in the immediate vicinity of the glue line to insure that the two sheets V, V1 shall be in the same plane in the region where the glue line is subjected to the high-frequency field.

In the particular arrangement shown in Figs. 1 to 3, the sheets are automatically fed by a pair of feed belts 13, 13 respectively disposed on opposite sides of electrode 12 and extending substantially in the same plane as the upper face of electrode 12. The pressure exerted upon the upper faces of the sheets by the springs 24, 24 and/or by the hands of the operator maintains frictional engagement between the belts 13, 13 and the lower faces of the sheets V, V1 so that the sheets are fed in the direction of the arrows, Figs. 1 and 3, with the glue line G continuously advancing in the narrow high-frequency field between the electrodes. Preferably, the belts 13, 13 are "toed-in," as shown, in the direction of travel of the sheets so that they also exert lateral pressure on the sheets, maintaining intimate engagement of the adhesively-coated abutting edges of the sheets. This lateral pressure is obtainable by so mounting the pulleys 14, 14 at the forward end of the machine that the belt spacing is there substantially greater than at the rear end of the machine where pulleys 15, 15 are more narrowly spaced. In the particular arrangement shown in Figs. 1 to 3, the faces of pulleys 14 and 15 are provided with V grooves to receive the belts 13, preferably of rubber. The feed belts 13, 13 may be driven in any suitable manner as by drive belt 16 from an electric motor or equivalent.

By way of example, with a machine such as shown in Figs. 1 to 3, using electrodes about ten inches in length energized from a 2½ kw. high-frequency generator operating at about 27 megacycles, good splicing of quarter-inch veneers was obtained at feeding speeds up to fifteen feet per minute with five hundred volts on the electrodes. This speed has been greatly exceeded and even for much thicker stock with the tapeless splicing machines of the subsequent figures.

In its essentials, the high-frequency tapeless splicing machine shown in Figs. 5 to 8 is similar to that of Figs. 1 to 3. In this modification, however, the lower electrode is formed by the metallic belt 32 which feeds the sheets of veneer or other stock under the upper electrode 37 which in this modification extends substantially the entire length of the work-supporting table 30 or equivalent. The work sheets being spliced are held in a common plane flat against the table top by two series of rollers 33 respectively disposed on opposite sides of and adjacent the high-frequency electrode 37 with the individual rolls spaced at intervals along the length of the electrode. As most clearly appears in Fig. 7, the rollers 33 are "toed-in" in the direction of travel of the sheets to provide a transverse pressure which maintains the abutting, adhesively-coated edges of the sheets in intimate contact as they move lengthwise of the high-frequency field in the narrow gap between the upper electrode 37 and the chain 32.

As shown most clearly in Fig. 4, the upper face of the chain 32 in its travel beneath electrode 37 is substantially flush with the upper face of the table 30 and the rollers 33 are supported directly above the chain electrode 32. The operator positions the sheets to be spliced upon the table with the glue line directed towards the narrow end of the upper electrode. Upon pushing the leading ends of the sheets below the leading rollers 33, they are pressed into intimate engagement with the feed chain which thereupon moves the sheets to bring successive increments of the glue line below successive increments of length of the upper electrode.

As in the system of Figs. 1 to 3, heat generated within the glue line by the high-frequency field effects setting of the adhesive. Using a 2½ kw. high-frequency generator operating at 27 megacycles and with an upper electrode of approximately five feet in length, a gluing rate of about sixty feet per minute on $\tfrac{3}{16}$ veneer stock was obtained: this is more than three times the rate at which similar stock can be spliced by the latest types of tapeless splicers using heated bars.

In this modification, the upper electrode and the pressure rolls are supported from a metallic head 34 suspended from the overhanging frame member 39. Head 34 is adjustable toward and from the top of the work table 30 by a handwheel 40 to accommodate veneer stock of different thicknesses. The pressure exerted upon the upper faces of the sheets can be regulated by adjustment of the hand-wheels 47, 47 which control the compression springs 44, 44, Fig. 8.

With the machine constructed as thus far described, difficulty was experienced with arcing from the pressure rolls 33 to the chain 32. This was overcome by attaching sheet metal plates 49 and 50 to opposite sides of the head 34: the opposite sides of the sheets 49 and 50 are turned downwardly to overlap the edges of the table 30 so that the sheets 49, 50 cooperate with the metal, or metal-faced table 30 to form a metallic work tunnel 48 enclosing the electrodes and the machine parts in proximity thereto. This tunnel not only eliminates the arcing but also practically eliminates high-frequency radiation from the machine which otherwise is disturbing to reception of radio signals in a substantial area. As shown in Figs. 4 to 6, the tunnel sheets 49, 50 may be held in place by the angle bars 51, 51 of aluminum or other suitable conductive material.

In the particular upper electrode assembly shown in Fig. 9, the electrode 37 is a brass bar approximately five feet long, ⅜ inch wide and ½ inch high. The lower edges of the bar are slightly rounded to avoid corona and the work-engaging face is polished to minimize adherence of glue which is conducive to arcing. The forward end of the bar is tapered or shaped as at 37A to facilitate entry of the ends of sheets to be spliced. Near its opposite ends the electrode 37 is attached, as by screws 53, 53 to an insulator block 38A which may be of maple or other suitable hardwood. The blocks 38A, 38A are each attached as by screws 54 to a plate 55 at the lower end of vertical guide bar 41 which extends through the top of the supporting head 34.

With the construction shown in Fig. 9, there was some tendency for the electrode to sag near the center so resulting in a non-uniform voltage gradient between this electrode and the lower electrode. To overcome this, the insulator blocks 38A, 38A were replaced, Fig. 10, by an insulator block 38B extending the entire length of the electrode. However, with this construction, and to lesser extent with that of Fig. 9, difficulty was sometimes experienced with arcs that started between the hot electrode 37 and the belt 32 and which in progressing up the insulator block effected some carbonizing of it. To minimize this difficulty and to retain the required mechanical stiffness, the insulator block 38B was replaced by the block 38C, Fig. 11, whose bottom edge was scalloped as by a series of substantially semi-circular openings 56. With this form of electrode assembly, Fig. 11, the tapeless splicing machine of Figs. 4 to 6 provides for satisfactory setting of the glue line of rather thick veneer (¼") when the rate of feed of the stock is as high as eighty-five feet per minute, over four times the feed rate obtainable with tapeless splicers using heated bars.

As shown in Figs. 4 and 5, the feed chain 32 can be driven from an electric motor 42 through a feed belt 43.

The high-frequency generator 46 used with this and other machines herein described may be one similar to that disclosed in U. S. Letters Patent No. 2,438,595 to Zottu. The high-voltage lead 45 which extends from the radio-frequency generator 46 to the upper electrode 37 is in part disposed within the tunnel 48, Fig. 4, and in part through a metal conduit or housing 52 which extends from the metal casing of generator 46 to an opening in the upper face of the tunnel sheet 49. A sleeve for receiving the lower open end of the conduit 52 may be attached to the upper face of sheet 49 so to maintain the effective electrical continuity of conduit 42 for the various positions to which the tunnel may be adjusted.

With the machine shown in Figs. 4 to 6, unevenness in the wear of the links or plates of the belt 32 produces along the electrodes a non-uniformity in the voltage gradient which is a source of arcing. In the third form of machine shown in Fig. 13 et seq., this difficulty is overcome by using a stationary lower electrode as in the machine of Fig. 1 extended, however, for substantially the entire length of the work table 60. The feed belts 63, 63 of Fig. 14, like feed belts 13, 13 of Fig. 1, converge in the direction of travel of the sheets to maintain their abutting edges in intimate engagement as the glue line between the sheets is advanced lengthwise of the gap between the upper electrode 67 and the lower electrode 62. The pressure for maintaining the sheets in the same plane and for effecting their feed is provided by an upper pair of feed belts 83, 83 which form endless loops on opposite sides of the electrode and may converge in the direction of feed. The belts 83, 83 are disposed within the vertically-adjustable head 84 which is generally similar to the head 34 of the modification shown in Figs. 4 to 6. The tracks 80, 80 (Fig. 14) for guiding the upper portions of the belts 83, 83 are supported by cross members extending interiorly of the head 34: the track members 77 for guiding the lower portions of the belts 83, 83 are sectionalized, each section being supported by a bracket 82 at the lower end of a guide rod 81 vertically movable with head 84. The springs 74 press the lower track members 77 downwardly against the rolls 78 of the belts and so provide the feeding pressure required for advancing the sheets to be spliced. The links 79 of the belts pass over sprockets (not shown) disposed within the head 84 at opposite ends thereof. The lower feed chains 63, 63 may be driven by any suitable means not shown but generally corresponding with the arrangement shown in the preceding figures.

The lower high-frequency electrode 62 may be adjusted so that its upper face is substantially in the plane or slightly above the top of table 60 by a plurality of sleeves 65 which threadably engage the frame member 100 of the machine, Fig. 14. Preferably, the underface of the lower electrode 62 is provided with a slot or groove extending substantially the length thereof in which is disposed a block or bar 61 having enclosed therein electric heaters 64 which heat the lower high-frequency electrode 62 to a temperature sufficient to insure that any glue which is deposited thereon will set and flake off. In short, the high-frequency electrode is self-cleaning when bar 61 is used. So far as the setting of the glue in the glue line G is concerned, the electrode 62 could be operated "cold," but in such case glue accumulating thereon would not flake off and would be a potential source of arcing unless manually removed. For like reasons, the lower electrode of Figs. 1 to 3 may be heated to flaking temperature. The flaking bar 61 is removably held within the lower electrode 62 by a plurality of clamping screws 66 which respectively pass through the hollow adjusting sleeves 65 for the lower electrode. After the lower electrode and heater assembly has been adjusted to desired position, it can be clamped in place as by a plurality of bolts 72 which extend through the frame member 100 (Fig. 14).

The upper electrode assembly is essentially the same as that in the modifications previously described. However, the insulating block 68 which supports the electrode 67 and electrically isolates it from the metallic head structure is preferably of a material having high electrical insulating properties and which is heat-resistant and non-charring, such as "G–6" which is made by impregnating a plurality of layers of fibre glass cloth with a silicone resin. This same electrode assembly may, of course, be used to advantage in the previously described tapeless splicers. The electrode assembly is mounted upon the lower ends of the supoprting bars 71 by pairs of L-clamps 99 (Fig. 16) secured to the insulating bar 68 at suitable intervals lengthwise thereof. The upper electrode 67, generally similar to the upper electrodes previously described, is preferably a solid hard drawn brass bar with all of its faces hard-chrome-plated to resist adherence of glue. The electrode 67 is attached to the insulating bar 68 by a plurality of screws 73 whose lower ends are threaded into the upper face of the electrode leaving the lower face thereof free of depressions or openings.

Using such an electrode 67 having a length of somewhat over 5 feet, the tapeless splicer shown in Fig. 13 et seq. afforded good splicing of stock up to 3/8 inch thickness at speeds of 85 feet per minute; good bonds also resulted when the stock was 1/2 inch gum or 13/16 inch pine at speeds of 75 feet per minute; using in all cases a 2 1/2 kw. high-frequency generator operating at a frequency of 27 megacycles.

For reasons discussed in conection with description of Figs. 4 to 6, the work space of the splicer is enclosed by metal sheeting forming a tunnel, which reduces the voltage gradients between the upper electrode 67 and adjacent metallic parts which are beyond the gap between the electrodes 62 and 67. The tunnel also minimizes disturbance to radio-receiving equipment more or less remote from the machine. The lower wall of the tunnel is formed by the upper face of the work table 60 which is either of metal or is coated with metal sheeting. The upper and side walls of the tunnel 88 are formed by the metal sheets 89, 90 attached to the head 84 by the bars 87 and stiffened by the metal angle pieces 91.

As in the machine of Figs. 4 to 6, the head 84 is vertically adjustable, by actuation of screw 86, toward and away from the upper face of the work table to accommodate the machine to splicing of stocks of different thickness. To provide for electrical connection to the high-frequency electrode for any position to which the head may be adjusted without recourse to flexible conductors which would upset transmission characteristics of the feed line, transmission of radio-frequency power from the high-frequency generator 76 to the splicing machine is by a concentric line whose inner conductor is a stiff rod or bar 75 and whose outer conductor is a tube 92 slidably received at the load end of the line by a sleeve 93 fastened to tunnel sheet 89, Fig. 14, and slidably received at the generator end of the line by a similar sleeve attached to the generator housing.

The switch 95 (Fig. 13) for energizing and de-energizing the anode-supply circuit of the high-frequency generator unit 76 may conveniently be located on the head 84 of the machine with the control cable 94 extending along the supporting frame members 69 for the head. The power switch 97 for the generator 76 may be mounted upon the base member 70 of the machine with the power cable 98 extending therefrom: the other controls including one for operation of the feed belts may conveniently be located at the front of the machine on the under surface of the work table 60.

It shall be understood the invention is not limited to the particular forms of high-frequency tapeless splicing machine described and illustrated but that modifications and changes may be made within the scope of the appended claims.

This application is a continuation-in-part of copending application Serial No. 77,914, filed February 23, 1949.

What is claimed is:

1. A high-frequency tapeless splicer comprising feed table structure for supporting, in a common plane, work sheets having abutting edges coated with unset adhesive, a stationary high-frequency electrode having an upper planar face substantially flush with the upper face of said table and elongated in the direction of feed of said sheets, a second stationary electrode supported above and parallel to said first electrode and having a lower planar surface elongated in the direction of feed of said sheets, continuous feeding means for progressively feeding said sheets along said table structure in the flat and in direction progressively to move their abutting edges parallel to and lengthwise of the elongated narrow gap between said electrodes for progressive setting of the adhesive by the high-frequency electric field in said gap, and means for exerting pressure laterally of the sheets during their feed to maintain said abutting edges in intimate contact while the adhesive therebetween is subjected to said high-frequency field for formation of a continuous edge-to-edge splice.

2. A high-frequency tapeless splicer comprising feed table structure for supporting, in a common plane, work sheets having abutting edges coated with unset adhesive, a stationary high-frequency electrode having an upper planar face substantially flush with the upper face of said table and elongated in the direction of feed of said sheets, a second stationary electrode supported above and parallel to said first electrode and having a lower planar surface elongated in the direction of feed of said sheets, continuous feeding means for progressively feeding said sheets along said table structure in the flat and in direction progressively to move their abutting edges parallel to and lengthwise of the elongated narrow gap between said electrodes for progressive setting of the adhesive by the high-frequency electric field in said gap, and means for exerting pressure on the sheets during their feed to maintain them in a common plane and with their abutting edges in intimate contact while said adhesive is subjected to said high-frequency field for formation of a continuous edge-to-edge splice.

3. A high-frequency tapeless splicer comprising table structure for supporting work sheets side by side with their abutting edges coated with unset adhesive and extending in the direction of feed of the sheets, an electrically conductive endless feed structure for said sheets having an upper planar face substantially flush with the upper face of said table and elongated in the direction of feed of the sheets to engage the under faces thereof adjacent and along the line of adhesive between said abutting edges of the sheets, and a high-frequency electrode supported above and parallel to said feed structure and having a lower planar surface elongated in the direction of feed of the sheets to engage the upper faces thereof adjacent and along the line of adhesive between said abutting edges of the sheets and coacting with said endless feed structure to provide a long narrow high-frequency electric field into which said abutting edges are progressively fed for setting of the adhesive between them.

4. A high-frequency tapeless splicer comprising a table structure for supporting work sheets having abutting edges coated with unset adhesive, an electrically conductive endless feed structure for moving said sheets in the flat along said table in direction parallel to their abutting edges, a high-frequency electrode supported above and parallel to said feed structure and having a lower planar surface elongated in the direction of feed of the sheets and coacting with said endless feed structure to provide a long narrow high-frequency electric field into which said abutting edges are progressively fed for setting of the adhesive, and pressure rolls for pressing said sheets downwardly against said table and said feed structure to maintain them in the flat throughout their feed and for exerting lateral pressure maintaining said abutting edges in intimate contact during their passage lengthwise of said high-frequency field.

5. A high-frequency tapeless splicer comprising a table structure for supporting work sheets having abutting edges coated with unset adhesive, means for feeding said sheets in the flat including an endless metallic member for feeding said sheets along said table in direction parallel to their abutting edges and engaging the under surfaces of the sheets adjacent and along said abutting edges, and a high-frequency electrode supported to overlie said member and elongated in the direction of the path of movement of the adhesive line between said abutting edges.

6. A high-frequency tapeless splicer comprising table structure for supporting work sheets side by side in the flat with their abutting edges coated with unset glue and extending in the direction of feed of the sheets through the splicer, sheet-metal structure coacting with said table structure to define a tunnel extending in the direction of feed of the sheets, an elongated high-frequency electrode supported within said tunnel and extending longitudinally thereof along the path of movement of the glue line, and means for feeding said sheets in the flat through said tunnel with the glue line parallel to and below said high-frequency electrode.

7. A high-frequency tapeless splicer comprising metallic table structure for supporting work sheets having abutting edges coated with unset glue, an elongated high-frequency electrode, metal frame structure for supporting said electrode above said table structure, means for feeding said sheets with the glue line moving lengthwise of and below said high-frequency electrode, metallic members supported from said frame structure to engage and press said sheets to maintain them flat throughout their feed, and means for reducing the voltage gradient between the pressing members and said table structure comprising sheet-metal structure attached to said frame structure and coacting with said table structure to define a tunnel with said elongated electrode extending lengthwise thereof along the path of the glue line between the abutting edges of the flattened sheets.

8. A high-frequency tapeless splicer comprising table structure for supporting work sheets having abutting edges coated with unset glue, an elongated high-frequency electrode supported with its upper planar face substantially in the plane of said table structure and elongated in the direction of feed of the sheets to engage their under surfaces along the glue line between their abutting edges, a second high-frequency electrode disposed parallel to and above said first electrode with its lower planar surface elongated in the direction of feed of the sheets to overlie their upper surfaces along the glue line between their abutting edges, means for feeding the sheets to advance the glue line lengthwise of the high-frequency electric field between said electrodes for setting of the glue, and means for heating at least one of said electrodes to temperature insuring flaking off of any glue accumulating thereon so to avoid arcing to the glue.

9. A high-frequency tapeless splicer comprising an elongated high-frequency electrode having an upper planar surface for engaging the under faces of sheets to be spliced adjacent and along their abutting edges, a pair of endless feed members extending alongside said elongated electrode and respectively on opposite sides thereof continuously to engage the under faces of the sheets, a second high-frequency electrode supported with its lower planar surface elongated in the direction of feed of the sheets to overlie the upper faces of the sheets adjacent and along their abutting edges, and a pair of endless pressure members extending alongside said second elongated electrode, each above one of said endless feed members respectively to engage the upper faces of said sheets, said endless feed members and endless pressure members maintaining said sheets in the flat as their abutting edges are moved between and along said elongated high-frequency electrodes.

10. A high-frequency tapeless splicer comprising a pair of narrow elongated high-frequency electrodes vertically spaced approximately the thickness of sheets to be edge-spliced and with their narrow elongated faces opposed to each other in substantially horizontal planes, a table having its upper surface substantially flush with the upper face of the lower electrode and extending on opposite sides of said electrode respectively to support in a common plane sheets whose glue-coated abutting edges are in alignment with the elongated gap between said narrow electrodes, means for continuously feeding the sheets while so supported to move each successive increment of length of the glue line progressively along and within said gap for rapid progressive setting of the glue between said abutting edges, and pressure-applying means effective during feeding and support of the sheets to apply thereto lateral pressure insuring intimate engagement of said abutting edges while the glue is subjected to the high-frequency field between the narrow elongated electrodes.

11. A high-frequency tapeless splicer as in claim 10 in which, in avoidance of arcing, at least one of said electrodes is provided with an internal electric-resistance heater for raising the electrode temperature to degree insuring flaking off of any glue accumulation.

12. A high-frequency tapeless splicer as in claim 10 in which, in avoidance of arcing, the upper electrode is supported by a bar structure comprising layers of glass fibre impregnated with a silicone resin and substantially coextensive with said electrode.

13. A high-frequency tapeless splicer as in claim 10 in which the table is of metal, in which the upper electrode is supported by metal frame structure, which additionally includes metallic members supported from said metal frame structure to press the sheets against the table, and in which, in avoidance of arcing, there is provided sheet-metal structure attached to said frame structure and coacting with the table structure to define a tunnel with the upper electrode extending lengthwise thereof.

References Cited in the file of this patent

UNITED STATES PATENTS

| Number | Name | Date |
|---|---|---|
| 2,317,281 | Linquist | Apr. 20, 1943 |
| 2,457,498 | Russell et al. | Dec. 28, 1948 |
| 2,544,133 | Carlson | Mar. 6, 1951 |